T. H. MACDONALD.
DICTAPHONE RECORDER AND REPRODUCER
APPLICATION FILED JULY 28, 1910.
1,003,625.
Patented Sept. 19, 1911.
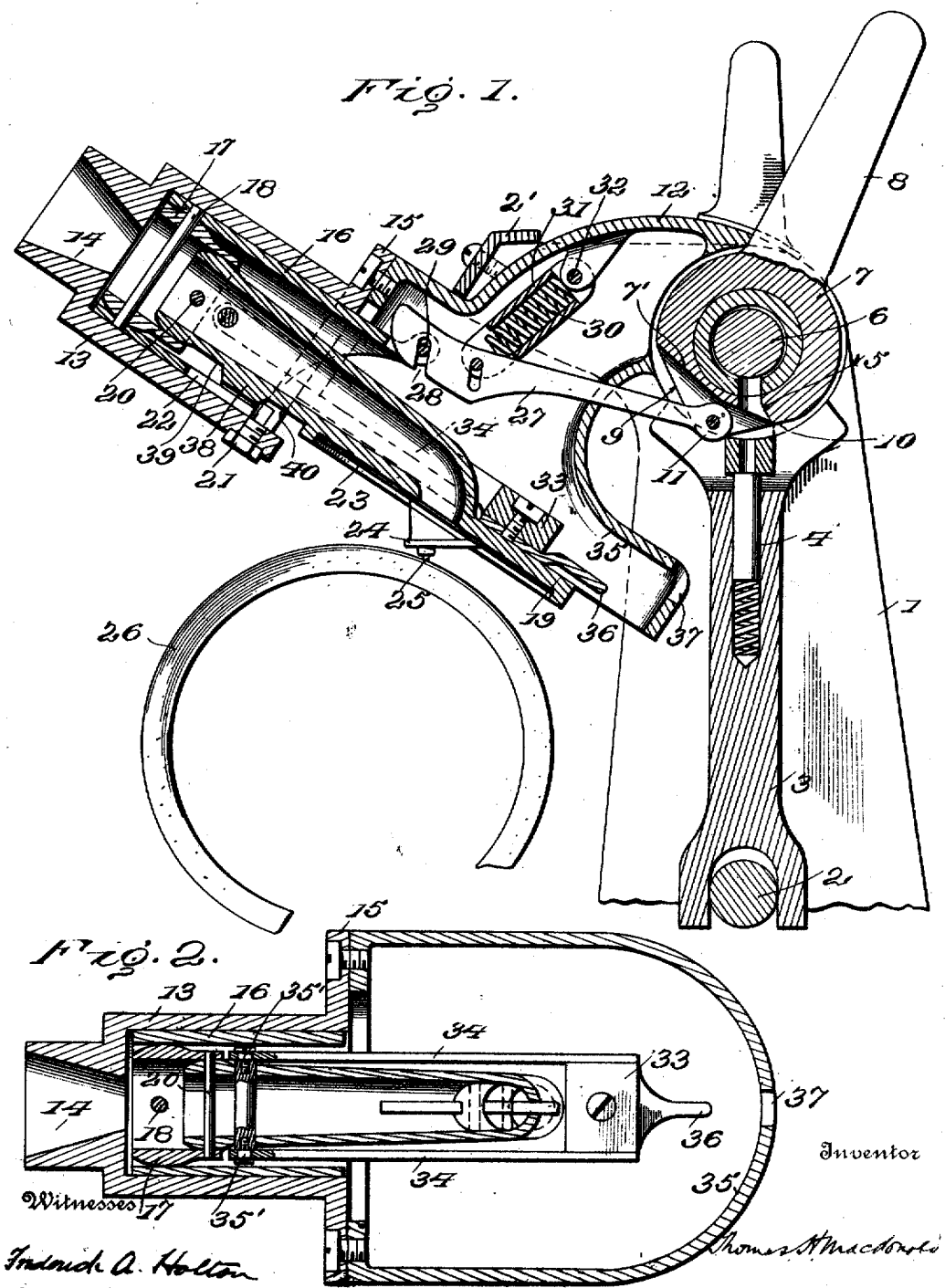

UNITED STATES PATENT OFFICE.

THOMAS H. MACDONALD, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

DICTAPHONE RECORDER AND REPRODUCER.

1,003,625.  Specification of Letters Patent.  Patented Sept. 19, 1911.

Application filed July 28, 1910. Serial No. 574,314.

*To all whom it may concern:*

Be it known that I, THOMAS H. MACDONALD, of Bridgeport, Connecticut, have invented a new and useful Improved Dictaphone Recorder and Reproducer, which invention is fully set forth in the following specification.

This invention relates to talking machines designed for dictation purposes where it is desirable to have the recorder and the reproducer combined in a single instrument, to the end that the operator may readily shift from recording to reproducing, or vice versa, and more particularly the invention relates to the recording and reproducing element, or, as it is now technically known in the art, the combined recorder and reproducer. In this art, it is recognized that the recording device should be lighter than the reproducing device, or, to express it another way, that the recording device should exert less pressure upon the record than does the reproducing device. It has, therefore, been proposed to make the recorder-reproducer with a single diaphragm having a recording stylus and a reproducing stylus mounted thereon and to provide means for shifting the recorder-reproducer so as to bring either one of the styles into operative relation with the record at will. It has also been proposed to mount a weight directly upon the recorder-reproducer and fixedly secured thereto, the relation of the parts being such that when the recorder-reproducer is adjusted into reproducing position the weight exerts a greater pressure through the style upon the record than it does when the recorder-reproducer is adjusted into recording position.

In my application Serial No. 450,811, filed August 29, 1908, I have shown and described, among other things, a recorder-reproducer having a single diaphragm provided with a recording and a reproducing style and means for shifting the recorder-reproducer so as to bring either style into operative relation with the record; and I have shown, coöperating with such recorder-reproducer, a weight mounted independent of the recorder-reproducer and, therefore, independent of the diaphragm mounting, with means for adding the weight to the recorder-reproducer, and hence also to the diaphragm, when the instrument is in reproducing position, and removing the weight therefrom when the instrument is in recording position.

My present invention is an improvement on that shown in my said application and it consists, generally speaking, in a combined recorder and reproducer having a single diaphragm with two stylus points secured thereto and a weight pivotally mounted directly upon the recorder-reproducer (instead of independent thereof as in my former application), with means for relieving the recorder-reproducer of the greater part of the weight when the instrument is in recording position and for applying the entire weight to the recorder-reproducer when the same is in reproducing position.

More specifically stated, the invention consists of a combined recorder-reproducer of the character last described with a weight having its main portion located approximately over the recording and reproducing styles and provided with a plurality of arms connected by a suitable pivot to the recorder-reproducer at or near the neck portion thereof.

I have shown the invention in the accompanying drawings, in which—

Figure 1 is a vertical section through the carriage of an ordinary dictating graphophone showing the combined recorder-reproducer in reproducing position; and Fig. 2 is a substantial horizontal section through the combined recorder and reproducer and its connecting parts.

Referring to the drawings, in which like reference numerals indicate like parts, 1 is a supporting standard, 2 is a horizontal guide rod, 3 is a guide arm carrying the plunger 4 and partial nut 5 for engaging feed screw 6. A ring 7 enters the cut-away portion of the feed nut 5 and is supported on feed screw 6 and operated by lever 8. The ring 7 has two cut-away parts or faces 9 and 10 with a nose 11 at the junction of said parts. When the nose 11 bears on the plunger 4, it depresses it and disconnects the nut from the feed screw, but when either of the parts 10 or 11 is opposite the cut-away portion in the nut 5, the spring plunger 4 throws the nut into engagement with the feed screw 6 and the machine is operated thereby, all as shown and described in my U. S. Letters Patent 569,290, dated October 13, 1896.

The casing 12 of the carriage has a tubular piece 13 secured thereto by flange 15, and receiving the tube of the mouth piece at its reduced end 14. Tube 16 telescopes within the tube 13 and is capable of longitudinal movement with relation thereto. The trunnion tube 17 is pivoted within the tube 16 by pivot pin 18 while the recorder-reproducer 19 is secured to the inner end of the trunnion tube 17 by the horizontal pin 20 which permits the recorder-reproducer to move up and down on said pivot. A set screw 21 passes up through the bottom wall of the fixed tube 13 and through the longitudinal slot 22 of the telescoping tube 16, thus permitting the telescoping tube 16 to have free longitudinal movement, while the pin 21, by reason of its engagement in the slot 22, prevents any axial or turning movement of the tube 16. The diaphragm 23 has a recording style 24 and a reproducing style 25 in position to operatively engage the record 26. The diaphragm mounting consists of a piece, preferably of metal, having a tubular opening 19' formed therein with the diaphragm secured opposite one end of said opening in the usual or any suitable manner, said mounting, as previously described, being carried on the transverse pivot 20. The said mounting, the diaphragm, and the two styles 24 and 25 together constitute the recorder-reproducer as a whole. A link 27 is pivoted to the ring 7 at the nose 11 and is provided with a slot 28 engaging a horizontal pin 29 on the telescoping tube 16, the link 27 and pin 29 being held in engagement by spring 30 mounted within tubular part 31 pivoted at 32 to the casing 12 and secured at its lower end by pivot and slot engagement to the link 27.

Referring to the pin 21 (Fig. 1), the same is in a position to coöperate with a cam face 38 having on the opposite sides thereof two seats 39 and 40. When the pin is in the seat 40, the reproducing point is in operative relation with the record; when the cam face 38 rests upon the pin 21 the recorder-reproducer is lifted from the record so that neither style contacts therewith; and when the pin 21 is in the seat 39 the recording style 24 is in operative relation with the record.

As thus far described, the construction is the same as that shown, described and claimed in my aforesaid application Serial No. 450,811. The essential difference between the construction of the present invention and that shown in my said application resides in the novel manner of mounting the weight. The weight in the present instance consists of the part 33 and its rearwardly extending arms 34, 34, which arms instead of being pivoted to the frame of the machine independently of the recorder-reproducer or the diaphragm mounting, are pivoted directly upon the recorder-reproducer or diaphragm mounting, thereby simplifying the construction and, as experience has proved, producing equal if not better results. As in the construction of my aforesaid application, the weight is provided with a nose 36 adapted to engage the adjacent seat 37 in the casing 12.

The operation will be understood by referring to Fig. 1, where the parts are shown in reproducing position. When the lever 8 is adjusted into vertical position, the link 27 will throw the telescopic tube 16 forward and with it the recorder-reproducer until the cam 38 of the recorder-reproducer rests upon the pin 21, thus elevating the reproducing style from the record and, of course, elevating the weight 33, 34, 34. The continued shifting of the lever from the vertical position to the left in Fig. 1 will advance the parts to the point where the nose 36 will engage the seat 37 in the frame 12, while the seat 39 of the recorder-reproducer will come opposite the pin 21, thus permitting the recorder-reproducer to descend, bringing the recording style 24 into contact with the record. By shifting the lever 8 in the reverse direction, the reverse movement will be secured, thus withdrawing the nose 36 of the weight 33, 34, 34 from the seat 37 and permitting the parts to return into the position shown in Fig. 1. It will thus be seen that the greater and most effective portion of the weight is withdrawn from the recorder-reproducer when the same is in recording position, but is returned to the recorder-reproducer when in reproducing position, thus automatically obtaining the desired result, viz., a recorder that is comparatively light and a reproducer that is comparatively heavy.

Having thus described my invention, what is claimed is:

1. In a sound recording and reproducing machine, an instrument comprising a single diaphragm and a mounting therefor, two stylus points mounted upon said diaphragm one for recording and the other for reproducing, in combination with a weight mounted directly upon the diaphragm mounting and wholly supported thereby during the reproducing operation and means other than the diaphragm mounting for supporting a portion of the weight for the recording operation and for returning it to the diaphragm mounting for the reproducing operation.

2. In a sound recording and reproducing machine, a combined recorder and reproducer, a carriage, pivotal connections between said recorder and reproducer and the carriage, a weight pivoted directly upon the recorder-reproducer adjacent to the pivot point of the latter and supported wholly upon the recorder-reproducer when in reproducing position, and means withdrawing a portion of said weight from the recorder-reproducer when the parts are in recording position.

In testimony whereof I have signed this specification in the presence of two subscribing witnesses.

THOMAS H. MACDONALD.

Witnesses:
EDNA THORPE,
A. B. KEOUGH.